United States Patent
Roger et al.

(10) Patent No.: US 9,329,079 B2
(45) Date of Patent: May 3, 2016

(54) REFLECTOR HAVING A DETECTOR TO DETECT THE PRESENCE OF LIGHT BEAM AGAINST THE REFLECTOR AND TO INDICATE A STATE OF ALIGNMENT USED IN A REFLEX MODE DETECTION DEVICE

(71) Applicant: Schneider Electric Industries SAS, Rueil Malmaison (FR)

(72) Inventors: Mireille Roger, Ruelle-sur-Touvre (FR); Gilles Gressier, Linars (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 88 days.

(21) Appl. No.: 14/257,399

(22) Filed: Apr. 21, 2014

(65) Prior Publication Data
US 2014/0346326 A1 Nov. 27, 2014

(30) Foreign Application Priority Data

May 21, 2013 (FR) ...................... 13 54551

(51) Int. Cl.
*G01J 1/04* (2006.01)
*G01V 8/10* (2006.01)

(52) U.S. Cl.
CPC *G01J 1/0414* (2013.01); *G01V 8/10* (2013.01)

(58) Field of Classification Search
CPC .......... G01J 5/28; G01J 3/021; G01J 1/0414; G02B 6/0031; G02B 6/0055; G01D 5/30; G01C 15/002; G01C 15/06; G01S 2007/4082
USPC ............... 250/214.1, 221, 216, 214 AL, 239; 359/222–242, 534–536; 340/555–557; 356/3.11, 3.12, 139.07, 139.08, 141.3
See application file for complete search history.

(56) References Cited

U.S. PATENT DOCUMENTS

| | | | |
|---|---|---|---|
| 5,554,972 A | 9/1996 | Byrne | |
| 6,222,457 B1 * | 4/2001 | Mills | B60D 1/36 250/491.1 |
| 8,274,727 B1 * | 9/2012 | Yap | G02B 5/128 235/454 |
| 2001/0045512 A1 | 11/2001 | Brent | |
| 2004/0042010 A1 | 3/2004 | Wuestefeld | |
| 2007/0297042 A1 | 12/2007 | Bifano | |

FOREIGN PATENT DOCUMENTS

DE 25 16 875 A1 10/1976
EP 1 850 057 A1 10/2007

OTHER PUBLICATIONS

French Preliminary Search Report and Written Opinion issued Nov. 29, 2013, in Patent Application No. FR 1354551, filed May 21, 2013 (with English Translation of Category of Cited Documents).

* cited by examiner

*Primary Examiner* — Que T Le
(74) *Attorney, Agent, or Firm* — Oblon, McClelland, Maier & Neustadt, L.L.P.

(57) ABSTRACT

A reflector for use in a reflex mode detection device, said reflector being positioned in alignment with a detector and including a reflective region for reflecting a light beam to send the light beam back towards the detector, a signalling interface configured to indicate a state of alignment of the reflective region of the reflector with respect to an emitter, a detector configured to detect the presence of the light beam against the reflector, interpretation circuitry configured to control the signalling interface to indicate the state of alignment, and a power supply having autonomous electric power and configured to supply electric power to the signalling interface and the interpretation circuitry.

8 Claims, 1 Drawing Sheet

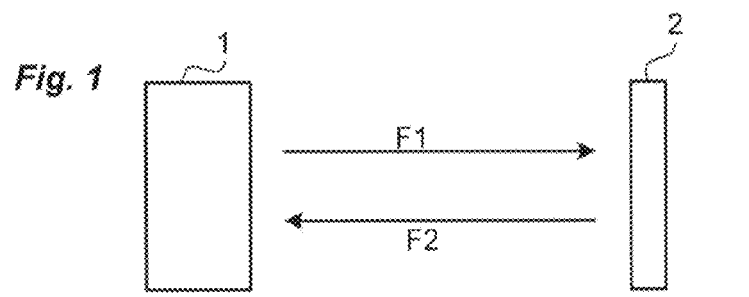
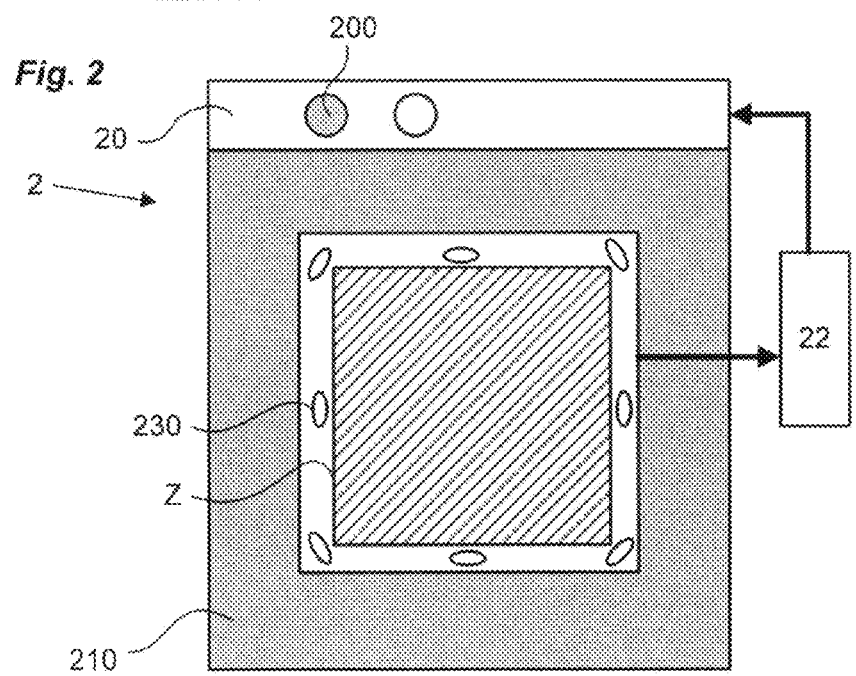
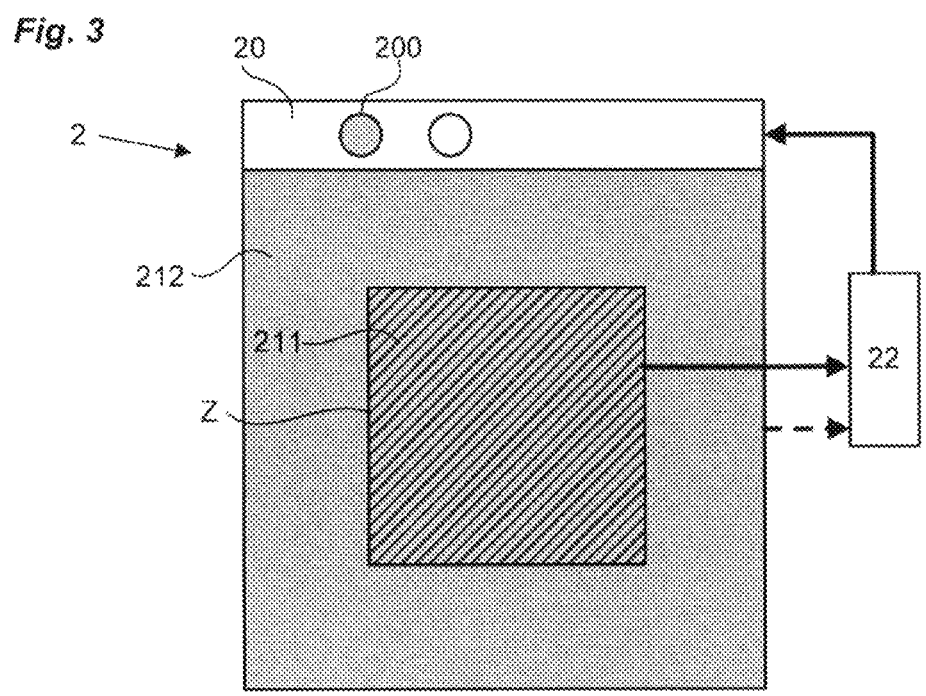

REFLECTOR HAVING A DETECTOR TO DETECT THE PRESENCE OF LIGHT BEAM AGAINST THE REFLECTOR AND TO INDICATE A STATE OF ALIGNMENT USED IN A REFLEX MODE DETECTION DEVICE

TECHNICAL FIELD OF THE INVENTION

The present invention relates to a reflector used in a reflex mode detection device and in the detection device using said reflector.

PRIOR ART

In a known manner, a reflex mode detection device includes a photoelectric detector and a reflector. The detector emits a signal in the form of a light beam that is reflected by the reflector. If the light beam is not interrupted, the latter is received by the detector. This outward-return journey of the light beam makes it possible to detect the presence of an object. The presence of a return signal indicates that no object has been found between the detector and the reflector. The absence of the return signal allows the detector to conclude that an object that has interrupted the beam is present.

To be able to operate, the detector and the reflector must be properly aligned. However, during installation, the operator does not have access to any simple means allowing him or her to make sure that the detector and the reflector are properly aligned.

Indeed, the detector and the reflector are often several meters apart and the light beam becomes more or less visible as a result. Furthermore, photoelectric detectors emit a red or infrared light signal. In the latter case, the beam is invisible.

The most commonly used technical solution to date consists in the addition of a red laser beam, emitted by the detector. This laser emission, which has the sole function of embodying the direction of detection of the detector, is not neutral in terms of electronic architecture and of fabrication cost.

Another solution consists in implementing a human-machine interface dedicated to the alignment on the photoelectric detector with the aim of indicating the level of reception of the return light beam. This solution is expensive and in particular increases the bulk of the detector that houses such an interface.

The aim of the invention is to propose a reflector enabling the installer to facilitate its alignment with respect to the detector.

Disclosure of the Invention

This objective is achieved by a reflector used in a reflex mode detection device, said reflector being intended to be positioned in alignment with a detector and comprising a reflective region for reflecting a light beam so as to send it back towards the detector, the reflector being arranged to fulfil:
  a signalling function using a signalling interface, said signalling interface being arranged to indicate a state of alignment of the reflective region of the reflector with respect to the emitter,
  a detection function so as to detect the presence of the light beam against the reflector,
  an interpretation function using an interpretation unit, said interpretation unit being arranged to operate on the signalling interface with the aim of indicating the state of alignment,
  a power supply function with autonomous electric power, so as to supply electric power to the signalling interface and the interpretation unit.

According to a particularity, the detection function and the power supply function are fulfilled by photovoltaic cells sensitive to the light of the light beam, distributed over a first region corresponding to the reflective region.

In a first variant embodiment, the detection function and the power supply function are fulfilled by photovoltaic cells sensitive to the light of the light beam, distributed over a second region peripheral to the first region.

In another variant embodiment, the power supply function is fulfilled by photovoltaic cells sensitive to ambient light, distributed over a second region peripheral to the first region.

In another variant embodiment, the detection function is fulfilled by photoreceptors arranged over a first region peripheral to the reflective region. In this other variant embodiment, the power supply function is fulfilled by photovoltaic cells sensitive to ambient light, distributed over a second region peripheral to the first region.

Advantageously, the signalling interface includes light indicators.

The invention also relates to a reflex mode detection device comprising a detector and a reflector, said reflector being of the kind defined above.

BRIEF DESCRIPTION OF THE FIGURES

Other features and advantages will become apparent in the following detailed description made with reference to the appended drawings in which:

FIG. 1 illustrates the operating principle of a reflex mode detection device,

FIG. 2 schematically represents the reflector of the invention, according to a first embodiment, FIG. 3 schematically represents the reflector of the invention, according to a second embodiment.

DETAILED DESCRIPTION OF AT LEAST ONE EMBODIMENT

A detection device operating in reflex mode includes a photoelectric detector 1 and a reflector 2. The photoelectric detector 1 includes an emitter arranged to emit a light beam F1 and a receiver arranged to receive a return light beam F2 reflected by the reflector 2, if the light beam F1 is not interrupted.

To reflect the light beam F1, the reflector 2 includes a reflective region Z that must be positioned in alignment with the emitter of the detector 1. However, the alignment is not always easy to obtain.

According to the invention, the reflector 2 includes:
  a signalling function,
  a power supply function,
  a detection function,
  an interpretation function.

According to the invention, the signalling function is fulfilled by a signalling interface 20 allowing the user to know whether the reflective region Z of the reflector is aligned or non-aligned with respect to the emitter of the detector.

The signalling interface for example includes one or more light indicators 200, the control of which at ignition or at extinction makes it possible to signal to the installer the state of alignment of the reflective region Z of the reflector 2 with respect to the emitter of the detector 1. By reading the state of the lights 200, the installer can thus for example know whether the reflector 2 is properly aligned, not aligned or partly aligned. Of course, other signalling interfaces, visual, audible, or others, could be envisaged.

The power supply function allows the reflector to fulfil the signalling function, the interpretation function and where applicable the detection function by powering its components needed to fulfil these functions.

The power supply function is fulfilled by photovoltaic cells 210, 211, 212 distributed at least partly over the surface of the reflector 2. The photovoltaic cells convert the luminous energy into electrical energy. This luminous energy comes from the ambient luminous energy and/or the luminous energy generated by the light beam F1 emitted by the emitter of the photoelectric detector. The light beam F1 preferably has red or infrared light.

The detection function allows the reflector to detect the presence of the light beam F1 on its surface.

The interpretation function enables the reflector to determine the state of alignment of the light beam coming or not coming onto its surface. This function is fulfilled by an interpretation unit 22, arranged to operate on the signalling interface 20 as a function of the state of alignment of the light beam F1 with respect to the reflector 2.

The various functions are fulfilled by electronic components preferably connected to one and the same electronics card integrated into the housing of the reflector 2. In a variant embodiment, the electronics card is arranged in an independent module on which the reflective region Z of the reflector 2 is then positioned. Once the reflective region Z has been aligned with the emitter, this module is removed.

In a first embodiment represented in FIG. 2, the power supply function is fulfilled by photovoltaic cells 210 sensitive to ambient light. They make it possible to capture luminous energy needed for supplying power to the interpretation unit 22 and the signalling interface 20 and for performing the detection function.

In this first embodiment, the detection function is fulfilled by photoreceptors 230, for example photodiodes and/or phototransistors, distributed over a first region situated around the reflective region Z. The photovoltaic cells 210 are themselves arranged in a second region that is peripheral to the region housing the photoreceptors 230.

In a second embodiment represented in FIG. 3, the power supply function and the detection function are fulfilled by photovoltaic cells 211 positioned over a first region corresponding to the reflective region Z and by photovoltaic cells 212 positioned over a second region, which is peripheral to the reflective region Z.

These photovoltaic cells 211, 212 are thus chosen to be sensitive to the red or infrared light of the light beam emitted by the emitter. They thus make it possible to detect the presence of the beam and to supply power to the interpretation unit 22 and the signalling interface 20 when the light beam is properly aligned. This arrangement, in which photovoltaic cells sensitive to the light from the emitted light beam are distributed over two regions, notably has the advantage of being able to detect the presence of the light beam F1 whatever the diameter of the beam.

In a variant embodiment, the photovoltaic cells 212 used in a second region do not fulfil the detection function but only a power supply function. For this, they are chosen to be sensitive to the ambient light.

In this second embodiment, the interpretation unit 22 analyses the electrical energy generated by the photovoltaic cells sensitive to red or infrared light positioned in the first region and where applicable in the second region. The interpretation unit 22 then determines whether the light beam F1 is indeed directed towards the reflective region Z, or otherwise. The relative charge of capacitors connected to each photovoltaic cell or set of photovoltaic cells sensitive to red or infrared light makes it possible, for example, to discern the quantity of luminous energy recovered and thus to locate the light beam F1 coming from the emitter on the reflective region Z.

The invention claimed is:

1. A reflector for use in a reflex mode detection device, said reflector being positioned in alignment with a detector and comprising:
 a reflective region for reflecting a light beam to send the light beam back towards the detector;
 a signalling interface configured to indicate a state of alignment of the reflective region of the reflector with respect to an emitter;
 a detector configured to detect the presence of the light beam against the reflector;
 interpretation circuitry configured to control the signalling interface to indicate the state of alignment; and
 a power supply having autonomous electric power and configured to supply electric power to the signalling interface and the interpretation circuitry.

2. The reflector according to claim 1, wherein the detector and the power supply are photovoltaic cells sensitive to the light of the light beam, distributed over a first region corresponding to the reflective region.

3. The reflector according to claim 2, wherein the detector and the power supply are photovoltaic cells sensitive to the light of the light beam, distributed over a second region peripheral to the first region.

4. The reflector according to claim 2, wherein the power supply is photovoltaic cells sensitive to ambient light, distributed over a second region peripheral to the first region.

5. The reflector according to claim 1, wherein the detector is photoreceptors arranged over a first region peripheral to the reflective region.

6. The reflector according to claim 5, wherein the power supply is photovoltaic cells sensitive to ambient light, distributed over a second region peripheral to the first region.

7. The reflector according to claim 1, wherein the signaling interface includes light indicators.

8. A reflex mode detection device comprising:
 a detector; and
 a reflector as defined in claim 1.

* * * * *